United States Patent [19]

Yau

[11] Patent Number: 5,962,625
[45] Date of Patent: Oct. 5, 1999

[54] HIGH CLARITY POLYESTER CONTAINING SUB-VISUAL ANTIMONY PHOSPHATE DERIVATIVES PARTICLES

[75] Inventor: Cheuk Chung Yau, Kingsport, Tenn.

[73] Assignee: Eastman Chemical Company, Kingsport, Tenn.

[21] Appl. No.: 09/103,883

[22] Filed: Jun. 24, 1998

[51] Int. Cl.$^6$ .................................................. C08G 63/78
[52] U.S. Cl. ..................... 528/285; 528/286; 528/298; 528/302; 528/308; 528/308.6; 524/706; 524/710
[58] Field of Search ..................... 528/285, 286, 528/298, 302, 308, 308.6; 524/706, 710

[56] References Cited

U.S. PATENT DOCUMENTS 4,408,004  10/1983  Pengilly .
4,499,226  2/1985  Massey et al. .

OTHER PUBLICATIONS

Neiman, Kolloidnyi Zhurnal (trans. Colloid Journal of USSR) (1969).

*Primary Examiner*—Samuel A. Acquah
*Attorney, Agent, or Firm*—Karen A. Harding, Esquire; Harry J. Gwinnell, Esquire

[57] ABSTRACT

Disclosed herein is an esterification process characterized by the high dilution in situ addition of antimony catalyst compound and phosphorus stabilizer compound to the esterification reaction mixture. A high dilution polymerization process for producing antimony phosphate derivative-containing polymer is also disclosed. Further disclosed are high clarity polyesters containing sub visual antimony phosphate derivative particles.

21 Claims, No Drawings

HIGH CLARITY POLYESTER CONTAINING SUB-VISUAL ANTIMONY PHOSPHATE DERIVATIVES PARTICLES

FIELD OF THE INVENTION

The present invention relates to polyesters. More particularly, the present invention relates to a polyester process wherein an antimony polycondensation catalyst compound and a phosphorus stabilizer compound are employed. The process of the present invention enables the production of higher clarity polyester containing sub-visual antimony phosphate particles.

BACKGROUND

Phosphorus stabilizer compounds such as alkyl phosphates and phosphoric acid are commonly added to polyester reaction mixtures as essential components in achieving low color and high stability in polyester polymers. Antimony compounds such as antimony trioxide, antimony triacetate and antimony ethylene glycoxide are commonly used polycondensation catalysts for high clarity polyester manufacturing. Antimony catalysts are also considered essential in the commercial production of polyesters, especially poly(ethylene terephthalate) or its copolymers. However, antimony phosphate particles are formed in the polyester when both antimony and phosphate ions are present during polymerization. The presence of antimony phosphate particles large enough to scatter light (particle diameter greater than about 200 nm) causes haziness in the polyester. An additional detrimental effect of large particles is that larger antimony phosphate particles cause a decrease in the catalytic activity of antimony, thus slowing down the rate of polymer production.

U.S. Pat. No. 4,408,004 and U.S. Pat. No. 4,499,226 teach that polyester polymer haze is somewhat reduced when the antimony catalyst compound is added during the condensation stage of the polymerization process and the phosphorus stabilizer compound is added at an earlier point, at least during early condensation, but preferably during the beginning of the esterification stage. However, the polyester made by such methods is still undesirably hazy.

In addition to the undesirable amount of haze provided by known methods, it is commercially undesirable to be confined to such an inflexible process. It would be better if the point of addition of materials such as stabilizers and catalysts could be determined mainly by process economics so that less energy capital is required to carry out the process. For example, it is particularly inefficient to add a solution of catalyst materials during the polycondensation stage because more solvent needs to be removed in the polycondensation stage than is normally designed for the process.

In light of the above, it would be desirable to provide a process for producing an antimony phosphate-containing polyester having a higher clarity than previously possible by known processes. It would be further desirable if such process were flexible enough so that the points of addition of the antimony catalyst compound and phosphorus stabilizer compound were very flexible. It would be even furter desirable for such process to be more economical and have a higher production rate than previously known antimony and phosphorus based polyester processes.

SUMMARY OF THE INVENTION

The esterification process of the present invention comprises reacting a mixture of dicarboxylic acid having 2 to about 20 carbon atoms with diol having 2 to about 16 carbon atoms in a solvent having a boiling point between above the boiling point of water and about 300° C., under esterification or prepolymer conditions, said esterification process being characterized by separately adding, under high dilution, antimony catalyst compound and phosphorus stabilizer compound to said mixture, thereby forming polyester oligomers containing antimony phosphate particles.

Another aspect of the present invention is a polyester oligomer which comprises:

(a) a dicarboxylic acid component comprising dicarboxylic acid units having 2 to about 20 carbon atoms; and (b) a diol component comprising diol units having 2 to about 16 carbon atoms;

said oligomer having an inherent viscosity from above 0 to about 0.2 dL/g, measured in 40:60 v/v phenol/tetrachloroethane, and wherein said oligomer contains antimony phosphate particles having an average diameter less than about 200 nm.

A further aspect of the present invention is a polymerization process which comprises:

(a) reacting a mixture of a dicarboxylic acid having 2 to about 20 carbon atoms with diol having 2 to about 16 carbon atoms under esterification or prepolymer conditions to form polyester oligomer; and (b) polycondensing said polyester oligomers under polycondensation conditions;

wherein said polymerization process is characterized by separately adding, under high dilution, antimony catalyst compound and phosphorus stabilizer compound, thereby forming polyester polymer containing antimony phosphate particles.

An even further aspect of the present invention is a polyester polymer which comprises:

(a) a dicarboxylic acid component comprising dicarboxylic acid units having 2 to about 20 carbon atoms; and (b) a diol component comprising glycol units having 2 to about 16 carbon atoms;

said polymer having an inherent viscosity of about 0.2 to 1.2 dL/g, as determined in 40:60 v/v phenol/tetrachloroethane, said polymer containing antimony phosphate derivative particles having an average diameter of less than about 200 nm.

DETAILED DESCRIPTION OF THE INVENTION

The applicant was surprised to find a process for producing a higher clarity antimony phosphate-containing polyester. It was unexpectedly found that when the antimony catalyst compound and phosphorus stabilizer compound are mixed together in situ in a polyester reaction mixture, under high dilution conditions, that a polyester having very high clarity is formed. Alternatively the antimony phosphate compounds can be formed separately as disclosed in U.S. Ser. No. 09/103,785 filed Jun. 24, 1998 and added in the polyester manufacturing process anywhere prior to the beginning of polycondensation.

The benefits of adding the antimony and phosphorus materials to the reaction mixture under high dilution were unexpected. Neiman, *Kolloidnvi Zhurnal* (trans. *Colloid Journal of USSR*) (1969), discloses that calcium sulfate ($CaSO_4$) crystal growth rate increases with greater dilution. So it was surprising to find that the antimony phosphate particles formed by the present process did not likewise grow faster under a higher dilution environment. Despite the teaching of U.S. Pat. No. 4,499,226 to the contrary, the applicants further found that, with the present high dilution process, good results are achieved regardless of the order in which the antimony compound and phosphorus compound are added.

The applicants found that an increase in energy capital is required to remove the greater amount of excess solvent used for creating the high dilution environment. So the applicants discovered a particularly economical way of achieving the high dilution required for the present process without significantly increasing the total reaction volume. In this preferred low volume process, a high dilution environment is created by adequately diluting the second of the two compounds in solvent reflux prior to adding it to the reaction mixture already containing the first of the two compounds. There is no suggestion in the polyesterification art of the benefits of adding potentially crystal-forming or large particle-forming agents to a polyester reaction mixture by diluting such agents in a solvent reflux stream.

The generally known three-stage polyesterification processes are suitable for use as part of the process of the present invention. The three polymerization stages are hereinafter referred to as esterification or ester exchange stage, the prepolymer stage, and the polycondensation stage. The basic conditions which define these three stages throughout the present application are set out below for convenience and clarity.

In the first stage of the melt-phase process, a mixture of polyester monomer (diglycol esters of dicarboxylic acids) and oligomers are produced by conventional, well-known processes. The ester exchange or esterification reaction is conducted at a temperature between about 220° C. to about 250° C. and a pressure of about 0 to about 20 psig in the presence of suitable ester exchange catalysts such as lithium, magnesium, calcium, manganese, cobalt and zinc, or esterification catalysts such as acids or titanium suitable forms of which are generally known in the art. The catalysts can be used alone or in combination. Preferably the total amount of catalyst is less than about 100 on an elemental basis Suitable colorants may also be added at this point. The reaction is conducted for about 1 to about 4 hours. It should be understood that generally the lower the reaction temperature, the longer the reaction will have to be conducted.

Generally at the end of esterification or ester exchange, a polycondensation catalyst is added. Suitable polycondensation catalysts include salts of titanium, gallium, germanium, tin, antimony and lead, preferably antimony or germanium or a mixture thereof. Preferably the amount of catalyst added is between about 90 and about 250 ppm when germanium or antimony is used. Suitable forms such as, but not limited to antimony oxide are well known in the art. The prepolymer reaction is conducted at a temperature less than about 280° C., and preferably between about 240° C. and about 280° C. at a pressure sufficient to aid in removing undesirable reaction products such as ethylene glycol. The monomer and oligomer mixture is typically produced continuously in a series of one or more reactors operating at elevated temperatures and pressures at one atmosphere or greater. Alternately, the monomer and oligomer mixture could be produced in one or more batch reactors.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas which does not cause unwanted reaction or product characteristics. Suitable gases include, but are not limited to $CO_2$, argon, helium and nitrogen.

Temperatures for this step are generally between about 240° C. to about 280° C. and a pressure between about 0 and 2 mm Hg. Once the desired inherent viscosity is reached, the polymer is pelletized. Precursor I.V. is generally below about 0.7 to maintain good color. The target I.V. is generally selected to balance good color and minimize the amount of solid stating which is required. Inherent viscosity (I.V.) was measured at 25° C. using 0.50 grams of polymer per 100 ml of a solvent consisting of 60% by weight phenol and 40% by weight tetrachloroethane.

The process of the present invention includes reacting a mixture of a $C_2$ to $C_{20}$ dicarboxylic acid with a $C_2$ to $C_{16}$ diol in a solvent having a boiling point from above the boiling point of water to about 300° C. under esterification or prepolymer conditions to form polyester oligomers. The present process is characterized by separately adding an antimony polycondensation catalyst compound and a phosphorus stabilizer compound to the reaction mixture in a manner so that the two compounds are mixed together under conditions of high dilution. The term "high dilution" as used herein, refers both to the small mixing environment created by adding an already highly diluted antimony compound to an already highly diluted phosphorus compound, as well as referring to a low overall concentration of antimony and phosphorus compound in the total reaction volume.

In order to achieve the high dilution environment required to minimize antimony phosphate formation and growth, the antimony compound and the phosphorus compound should each be diluted to a concentration preferably no greater than about 0.1 weight percent, more preferably no greater than about 0.05 weight percent (calculated as the grams of Sb in the antimony catalyst compound or the grams of P in the phosphorus stabilizer compound per 100 grams of solution) before being mixed together in situ in the polymerization reaction mixture. The concentration of antimony (including elemental Sb, free ionized $Sb^{(3+)}$, and reacted $Sb^{(3+)}$) in the total esterification reaction mixture after the addition of both the antimony compound and the phosphorus compound is preferably between about 10 to 500 ppm, more preferably about 50 to 300 ppm, with about 150 to 250 ppm being most preferable (ppm calculated as the weight of the element in the final polymer). The concentration of phosphorus (including ionized $PO_4^{(3-)}$ and reacted $PO_4^{(3-)}$) in the total esterification reaction mixture after the addition of both the antimony compound and the phosphorus compound is preferably between about 1 to 500 ppm, more preferably about 5 to 200 ppm, with about 10 to 100 ppm being most preferred.

The antimony catalyst compound utilized in the process of the present invention can be generally any trivalent antimony polycondensation catalyst compound known in the art. Examples of specific antimony catalyst compounds include antimony triacetate, antimony trioxide, antimony ethylene glycoxide, and the like.

The phosphorus stabilizer compound utilized in the process of the present invention can be phosphoric acid, phosphorous acid, an aryl phosphate ester, an alkyl phosphate ester, an aryl phosphite, an alkyl phosphite, or a mixture thereof, with alkyl phosphate esters being preferred. Examples of suitable phosphate esters are triethyl phosphate, trimethyl phosphate, diethyl hydrogen phosphate, ethyl dihydrogen phosphate, dimethyl hydrogen phosphate, methyl dihydrogen phosphate, triphenyl phosphate, and mixtures thereof. The reaction products of alkyl phosphate and ethylene glycol are equivalents to their corresponding phosphorus stabilizers. These include, for example, tris (2-hydroxyethyl) phosphate, bis (2-hydroxyethyl) hydrogen phosphate, and 2-hydroxyethyl dihydrogen phosphate. The alkyl and aryl phosphites corresponding to the examples of phosphate esters and their reaction products with ethylene glycol listed above are also suitable phosphorus stabilizer compounds.

The esterification and prepolymer conditions required for the present process are well known in the polymers art. Generally, dicarboxylic acid is reacted with diol to form esters and water. The water formed is removed from the reaction mixture by distillation using a partial condenser operated at a temperature above the boiling point of water yet below the boiling point of the solvent so that the solvent is refluxed back into the reaction mixture. The solvent used in the esterification reaction of the present process can be any suitable organic solvent having a boiling point of about 100 to 250° C., preferably about 140 to 210° C. It is preferable to use excess reactant glycol as the solvent. Ethylene glycol is preferred, having a boiling point of about 198° C.

Alternatively the antimony catalyst compound and the phosphorus stabilizer compound are combined prior to addition to the polyester manufacturing process as disclosed in U.S. Ser. No. 09/103,785, filed Jun. 24, 1998. The preformed antimony phosphate derivative particles can be added to the polyester manufacturing process anywhere prior to the polycondensation stage.

The preferred method of achieving the required high dilution environment in the present invention is a method by which the total esterification volume is kept to a minimum. This is preferable so that less heating is required to drive off excess solvent. A particularly preferred low volume method is to add the second of the antimony and phosphorus compounds into the esterification reaction mixture already containing the first of the two compounds by sufficiently diluting a concentrated reagent of the second compound in solvent reflux. For present purposes, the term "solvent reflux" includes any form of reaction mixture solvent which has been somehow separated away from the reaction mixture and is returning back into the reaction mixture. This includes typical solvent reflux and equivalents such as the return from solvent refining systems, and such. This can be done most easily by slowly adding a reagent of the second compound into a stream of refluxing solvent as it begins its downward flow back into the reaction pot. The physical point of addition of the second compound must be high enough in the distillation apparatus so that the second compound is sufficiently diluted in solvent before being mixed with the reaction mixture which contains the first compound.

It is an aspect of the process of the present invention that the antimony catalyst compound can be added to the polymerization mixture either before, at the same time, or after the phosphorus stabilizer compound is added. High dilution is preferably achieved by adding the two compounds, not only separately, but at different times. The choice of order of addition will mainly depend on convenience. In the preferred process of the present invention, the first of the stabilizer and catalyst compounds is added to a slurry of dicarboxylic acid, glycol, and solvent near 0 percent conversion. Then the second of the stabilizer and catalyst compounds is added to the mixture after reaching the boiling point of the solvent so that solvent reflux is established for adequately diluting the second compound.

In the preferred low volume method of carrying out the present invention, the first of the two compounds, preferably in the form of an approximately 1.0 wt/wt % concentrated solution of P or Sb in solution, is added to the reaction mixture at 0 to about 99.9 percent conversion to the oligomers. The second of the two compounds is diluted to about 0.0001 to 0.1 wt/wt percent in solvent reflux and added to the reaction mixture at greater than about 75 percent conversion. Surprisingly, a lower conversion environment of about 85 percent conversion, or less, does not promote the formation of larger particles. However, a conversion of greater than about 90 percent is preferred for adding the second of the two compounds.

The esterification reaction of the process of the present invention is performed under atmospheric pressure or elevated pressures of about 0 to 100 psig (100 to 800 kPa), preferably about 0 to 10 psig (100 to 200 kPa), at a temperature of from above the boiling point of water to about 300° C. The degree of polymerization for this stage is about 1 to 5, forming the low molecular weight antimony phosphate-containing polyester oligomers of the present invention.

The dicarboxylic acid used to form the polyester oligomers of the present invention can be a $C_8$ to $C_{20}$ aromatic acid, a $C_2$ to $C_{12}$ aliphatic acid, or a mixture thereof. Suitable examples of aromatic dicarboxylic acids include terephthalic acid, phthalic acid, isophthalic acid, 4,4'-biphenyldicarboxylic acid, 1,4-, 1,5-, 2,6-, 2,7-naphthaienedicarboxylic acid, 4,4'-oxybenzoic, trans-4,4'-stilbenedicarboxylic acid, and mixtures thereof. Suitable examples of aliphatic dicarboxylic acids include oxalic, malonic, succinic, glutaric, adipic, pimelic, suberic, azelaic, and sebacic acids, and mixtures thereof. Cycloaliphatic acids such as cyclohexanedicarboxylic acid may also be used. The preferred acid is at least about 50 mole % and more preferably at least about 80 mole % aromatic, more preferably terephthalic acid, naphthalenedicarboxylic acid(s), isophthalic acid and mixtures thereof with terephthalic acid and mixtures including terephthalic acid being most preferable. The polyester oligomers of the present process can alternatively be prepared from corresponding esters of dicarboxylic acids or mixtures of diacids and esters. Examples of suitable esters of the dicarboxylic acids useful in the present invention include the dimethyl, dipropyl, diisopropyl, dibutyl, and diphenyl esters, and the like.

The diol used to form the polyester oligomer of the present invention can be any suitable aliphatic, cycloaliphatic or aromatic diprotic alcohol having from 2 to about 16 carbon atoms. Aliphatic diols are preferred. Suitable examples of aliphatic diols include ethylene glycol, 2,2,4,4-etramethyl-1,3-cyclobutanediol, 1,2-propanediol, 1,3-propanediol, neopentyl glycol, 1,4-butanediol, 1,5-pentanediol, 1,6-hexanediol, trans- or cis-1,4-cyclohexanedimethanol, p-xylene glycol, and mixtures thereof. The preferred diols for the present invention comprise at least about 50 mole % and more preferably at least about 80 mole % ethylene glycol and mixtures containing ethylene glycol.

The polyester oligomers formed from the process of the present invention contains antimony phosphate derivative particles significantly smaller than the antimony phosphate particles formed by a polyesterification process wherein phosphorus stabilizer and antimony catalyst compounds are mixed together under a typical lower dilution environment. The term "particles" as used herein, includes both crystalline and amorphous entities. Further, the term "antimony phosphate derivative" includes $SbPO_4$, alkyl or aryl phosphate esters and alkyl or aryl phosphites), ions dissociated from the above compounds, and elemental antimony. Another aspect of the present invention is the novel polyester oligomers having a dicarboxylic acid component comprising dicarboxylic acid units having 2 to 20 carbon atoms and a diol component comprising diol units having 2 to about 16 carbon atoms. The present polyester oligomer has an inherent viscosity of from above 0 to about 0.3 dL/g, preferably about 0.05 to 0.2 dL/g, measured in a solution of 40:60 v/v phenoVtetrachloroethane. Additionally, the antimony phosphate derivative particles contained in the polyester oligomer of the present invention are sub-visual, having an average diameter of less than 200 nm, preferably less than about 100 nm. The oligomer of the present invention preferably has a solution turbidity of less than about 20 NTU (nephelometric turbidity units), preferably less than about 10 NTU and more preferably less than 5 NTU, determined by measuring the turbidity of a solution of 2.30 g of ground oligomer in 30 mL of 30:70 v/v hexafluoroisopropyl alcohol/methylene chloride.

The process of the present invention may optionally include condensing the oligomers under polycondensation conditions of temperature and pressure to form a polyester polymer having an inherent viscosity of about 0.2 to about 1.2 dL/g, as determined in a solution of 40:60 phenol/tetrachloroethane and an average antimony phosphate derivative particle size less than about 200 nm, preferably less than about 100 nm.

The polyester polymer preferably has an inherent viscosity between about 0.4 to about 0.9 dL/g and preferably from about 0.5 to about 0.8 dl/g. The solution turbidity of the polyester polymer is preferably less than about 20 NTU, with less than about 10 NTU being more preferable and less than about 5 NTU being most preferable. The present invention also includes any copolymers formed from the present oligomer.

A further aspect of the present invention is a more flexible polymerization process wherein the antimony catalyst compound and the phosphorus stabilizer compound or the preformed antimony phosphate derivative particles are added in any sequence at any point in the 3 stage polymerization process. This aspect of the present invention includes reacting a mixture of a dicarboxylic acid having 2 to about 20 carbon atoms with diol having 2 to about 16 carbon atoms under esterification or prepolymer conditions to form a polyester oligomer, then polycondensing the oligomer under polycondensation conditions. The present polymerization process is characterized by separately adding, under high dilution, an antimony catalyst compound and a phosphorus stabilizer compound so that a polyester polymer containing sub-visual antimony phosphate derivative particles is formed. Polymer containing sub-visual antimony phosphate derivative particles will be formed by the present polyesterification process when the two compounds are added at any point. For example, the phosphorus stabilizer compound may be added during esterification and the antimony catalyst compound added during polycondensation, or both added during polycondensation, etc.

In the polymerization process aspect of the present invention, the preferred polyester reactants are terephthalic acid and ethylene glycol. The polymerization process preferably includes esterification and prepolymer stages conducted at a temperature from above the boiling point of water to about 300° C. and a pressure of about 0 to 100 psig (100 to 800 kPa), and a polycondensation stage of about 200 to 310° C. and a pressure of about 60 to 6,000 Pa.

The polymerization process of the present invention is useful in both the continuous polymerization and batch polymerization of high clarity polyester polymers. The polymerization process of the present invention has been found to provide a 10 to 30 percent increase in overall polyester polymerization production rate from standard catalyzed methods. The increased production rate is due to the increase in condensation catalytic activity promoted by smaller antimony phosphate derivative particles, and thus larger number of particles. Polyester additives such as bluing agents including cobalt compounds and organic dyes and such, and polyester branching agents can be added to the process of the present invention without a deleterious effect on the process.

The high clarity polyester polymer formed by the present invention is an even further novel aspect of the present invention. The present polyester polymer comprises a dicarboxylic acid component made up of dicarboxylic acid units having 2 to about 20 carbon atoms and a diol component having 2 to about 16 carbon atoms, both of which are more fully defined above. This polyester polymer is characterized by having an inherent viscosity of about 0.2 to 1.2 dL/g, as determined in a 40:60 v/v solution of phenol/tetrachloroethane and containing antimony phosphate derivative particles having an average diameter of less than about 200 nm, preferably less than 100 nm. The present polymer preferably has a solution turbidity of less than about 20 NTU, more preferably less than about 10 NTU and most preferably less than about 5 NTU. The preferred polymers are poly(ethylene terephthalate) and copolymers of poly (ethylene terephthalate).

The polyester polymer of the present invention is useful in producing high clarity articles of manufacture. These polyester polymers, particularly poly(ethylene terephthalate), are especially useful in making shaped articles such as preforms, profiles and pipes, blow molded articles such as bottles and containers and in making extruded films to be thermoformed into articles.

The following examples are intended to illustrate the present invention but are not intended to limit the reasonable scope thereof.

EXAMPLES

The following method was used in determining solution turbidity of the polymers in the Examples below: 2.30 g of the polymer sample was placed into a 8-dram vial. 30 mnL of 30:70 v/v hexafluoroisopropyl alcohol/methylene chloride was added. When a solution was obtained the solution was transferred to a HACH vial, from which solution turbidity was measured using a HACH TURBIDIMETER, Model 18900, calibrated between each measurement using GELEX secondary turbidity standard, 0–20 NTU range. The results were reported in nephelometric turbidity units (NTU).

Example 1

A 4-liter stainless steel reactor equipped with a partial condenser operating at 145° C. was purged with nitrogen. A slurry of terephthalic acid (830 g), ethylene glycol (511 g, 459 mL) and the antimony catalyst (22 mL, 1.0 wt/vol % of Sb as antimony triacetate in ethylene glycol) was added to the reactor. The reactor was pressurized to 60 psig (500 kPa). Agitation speed was set to 300 rpm. The temperature was then raised to 255° C. over 60 minutes. At this point, water was being vaporized and distilled off of the reaction mixture, and vaporized ethylene glycol was condensing in the lower end of the partial condenser and being refluxed back down into the reactor. The phosphorus stabilizer (6.4 mL, 1.0 wt/vol % of P as phosphoric acid in ethylene glycol) was added to the stream of downward flowing ethylene glycol reflux by being pumped into the system at a constant rate as a slow stream through the top of the partial condenser over a period of 60 minutes. After another 20 minutes, when volatiles essentially stopped to distill over, the pressure was relieved to atmospheric pressure over a period of 15 minutes. The clear melt was transferred to a receiver. After having been cooled to room temperature, the solid oligomers were separated from the receiver and were pulverized.

Example 2

Terephthalic acid/ethylene glycol oligomers (107.3 g) from Example 1 was placed into a 500 mL round bottom flask. The flask was provided with a polymer head, a stainless stirrer and a static nitrogen atmosphere. The flask was then heated to 265° C. and was maintained under these conditions for 10 minutes with a stirrer speed of 100 rpm. The temperature was then raised to 285° C. over 60 minutes while the pressure was reduced from atmospheric pressure to 1 torr over 60 minutes. These conditions were maintained for 120 minutes, and the vacuum was relieved to atmospheric pressure with nitrogen. The polymer was separated from the flask after cooling and was ground to pass a 3 mm screen.

The polymer had an inherent viscosity of 0.830 dL/g, measured in a solution of 40:60 v/v phenol/tetrachloroethane and displayed a solution haze of 39 NTU.

This example illustrates that poly(ethylene terephthalate) oligomers and polymer containing sub-visual antimony phosphate particles can be formed using the process of the present invention wherein the antimony catalyst compound is added to the reaction mixture first and then the phosphorus stabilizer compound is added later by being diluted in the ethylene glycol reflux.

Example 3 (Comparative to Examples 1 and 2)

In this Example, poly(ethylene terephthalate) oligomers were made according to the esterification method of Example 1, excepting that the phosphorus stabilizer, phosphoric acid in ethylene glycol, was added directly into the reaction mixture instead of being diluted in a stream of ethylene glycol reflux. Then the oligomers were polycondensed to form poly(ethylene terephthalate) polymers using the polycondensation conditions of Example 2.

The polymer had an inherent viscosity of 0.531 when measured in a solution of 40:60 v/v phenol/tetrachloroethane, and displayed a solution turbidity of 82 NTU.

A comparison of Example 2 with Example 3 shows a great improvement to both polymer inherent viscosity and clarity when the phosphorus stabilizer was mixed with the low conversion antimony-containing reaction solution under high dilution conditions instead of low dilution. The improved solution turbidity of Example 2 is a direct result of smaller particle size. The higher inherent viscosity indicates that the smaller average particle size provided a larger number of antimony particles for catalyzing the polycondensation reaction.

Example 4

This Example illustrates that the process of the present invention has similar results to Example 1 when the phosphorus stabilizer is added to the reaction mixture first before beginning heating and then the antimony catalyst is added later by being diluted in the ethylene glycol reflux.

This Example was conducted identically to Example 1 except for the phosphorus stabilizer (6.4 mL, 1.0 wt/vol % of P as phosphoric acid in ethylene glycol) was added to the reactor along with the terephthalic acid and ethylene glycol slurry. Then the antimony catalyst (22 mL, 1.0 wt/vol % of Sb as antimony triacetate in ethylene glycol) was later diluted in the ethylene glycol reflux before being mixed into the reaction mixture.

The polyester polymer formed by polycondensation of the oligomer had an inherent viscosity of 0.823 dL/g, when measured in a solution of 40:60 v/v phenol/tetrachloroethane. The polymer displayed a solution turbidity of 43 NTU.

As can be seen by comparison of Example 3 to Example 2, the resulting polymer weight and clarity were unexpectedly very similar, regardless of the order of addition of the antimony catalyst and the phosphorus stabilizer.

Example 5 (Comparative to Example 4)

In this Example, poly(ethylene terephthalate) oligomers were made according to the esterification method of Example 4, excepting that the antimony catalyst solution (22 mL, 1.0 wt/vol % of Sb as antimony triacetate in ethylene glycol), was added directly into the reaction mixture instead of being diluted in a stream of ethylene glycol reflux. Then the oligomers were condensed to form poly(ethylene terephthalate) polymers by the same condensation method of Examples 1 and 4.

The polyester polymer had an inherent viscosity of 0.512 when measured in a solution of 40:60 v/v phenol/tetrachloroethane. The polymer displayed a solution turbidity of 79 NTU.

A comparison of Example 4 with Example 5 shows a great improvement to both polymer inherent viscosity and clarity when the antimony catalyst was mixed with the low conversion phosphorus-containing reaction solution under high dilution conditions instead of low dilution. The improved solution turbidity of Example 4 is a direct result of smaller particle size. The higher inherent viscosity indicates that the smaller average particle size provided a larger number of antimony particles available for catalyzing the polycondensation reaction.

Example 6

A sample of the TPA/EG oligomers (107.3 g, 93% conversion) was placed into a 500 mL round bottom flask. The flask was provided with a polymer head, a stainless stirrer and a static nitrogen atmosphere. The flask was then heated to 266° C. When the oligomers had melted, the stirrer speed was set at 100 rpm. An ethylene glycol solution of antimony triacetate (2.6 mL, 1.0 wt/vol % Sb, 0.213 mmole) was added to the melt. An ethylene glycol solution of phosphoric acid (8.4 mL, 0.091 wt/vol %, 0.246 mmole) was added. The temperature was then raised to 270° C. over 10 minutes while the pressure was reduced from atmospheric to 150 torr. The temperature was then ramped to 285° C. over a period of 60 minutes while the pressure was ramped to 1.5 torr over the same 60 minutes. The pressure was then further reduced to 0.5 torr over a period of 5 minutes. These conditions were maintained for 100 minutes, during which time the stirrer speed was ramped to 50 rpm. Then the vacuum was relieved to atmospheric pressure with nitrogen. The polymer was separated from the flask after cooling and was ground to pass a 3 mm screen.

Example 7

Dimethyl terephthalate (116.4 g, 0.6 mole) and ethylene glycol (81.9 g, 1.32 mole) were placed into a 500 mL round bottom flask. The flask was provided with a polymer head, a stainless stirrer and a static nitrogen atmosphere. The flask was then heated to 195° C. When the mixture had melted, the stirrer speed was set at 100 rpm. The manganese catalyst (1.6 mL, 0.39 wt/vol % of Mn, 0.113 mmole, as manganese triacetate in ethylene glycol solution) was placed into the melt. The volatile was distilled off. After 60 minutes, the temperature was raised to 220° C. After 60 minutes, an ethylene glycol solution of triethyl phosphate (2.9 mL, 0.12 wt/vol % P, 0.113 mmole)was added followed by an ethylene glycol suspension of sub-visual antimony phosphate (12.0 mL, 0.24 wt/vol % Sb, 0.236 mmole) was added to the melt. The temperature was then raised to 270° C. over 10 minutes while the pressure was reduced from atmospheric to 150 torr. The temperature was then ramped to 285° C. over a period of 60 minutes while the pressure was ramped to 1.5 torr over the same 60 minutes. The pressure was then further reduced to 0.5 torr over a period of 5 minutes. These conditions were maintained for 100 minutes, during which time the stirrer speed was ramped to 50 rpm. Then the vacuum was relieved to atmospheric pressure with nitrogen. The polymer was separated from the flask after cooling and was ground to pass a 3 mm screen.

From the above Examples, the benefits of the process of the present invention should be evident to one of ordinary skill in the art. The flexibility of this high dilution process is of great economic benefit in itself. The polyester oligomer and polyester polymer of the present invention contain smaller antimony phosphate derivative particles than was possible by previously known methods.

I claim:

1. A process comprising:
   reacting at least one dicarboxylic acid or ester thereof having 2 to about 20 carbon atoms with at least one diol having 2 to about 16 carbon atoms in a solvent having a boiling point between above the boiling point of water and about 300° C., under esterification or prepolymer conditions comprising a temperature from above about the boiling point of water to about 300° C., and a pressure of about 10 to 800 kPa,
   said process being characterized by separately adding, under high dilution, antimony catalyst compound and phosphorus stabilizer compound to said mixture, thereby forming polyester oligomers containing antimony phosphate derivative particles.

2. The process of claim 1 wherein, after adding said antimony catalyst compound and said phosphorus stabilizer compound, the concentration of antimony in said mixture is about 10 to 500 ppm and the concentration of phosphorus in said mixture is about 1 to about 500 ppm, calculated as the weight of antimony and phosphorus, respectively, in said polyester oligomer.

3. The process of claim 1 wherein said phosphorus stabilizer compound is added to said mixture at 0 to about 99.9 percent conversion, and wherein said antimony catalyst compound is diluted in solvent reflux and added to said mixture at a concentration of about 0.0001 to about 0.1 wt/wt percent Sb in solution at greater than about 75 percent conversion.

4. The process of claim 3 wherein said antimony catalyst compound is added to the mixture having a degree of polymerization of from 1 to about 30.

5. The process of claim 1 wherein said antimony catalyst compound is added to said mixture at 0 to about 99.9 percent conversion, and wherein said phosphorus stabilizer compound is diluted in solvent reflux and added to said mixture at a concentration of about 0.0001 to 0.1 wt/wt percent P in solution at greater than about 75 percent conversion.

6. The process of claim 3 wherein said phosphorus stabilizer compound is added to the mixture having a degree of polymerization of from 1 to about 30.

7. The process of claim 1 wherein said solvent comprises said glycol.

8. The process of claim 1 wherein said antimony catalyst compound is selected from the group consisting of antimony triacetate, antimony trioxide, and antimony ethylene glycoxide, and said phosphorus stabilizer compound is selected from the group consisting of phosphoric acid, alkyl phosphate esters, aryl phosphate esters, phosphorous acid, alkyl phosphites, aryl phosphites, and a mixture thereof.

9. The process of claim 1 further comprising the step of polycondensing said polyester oligomer under polycondensation conditions to form a polyester.

10. The process of claim 9 wherein said polyester polymer has an inherent viscosity of about 0.2 to 1.2 dL/g, as determined in a solution of 40:60 v/v phenol/tetrachloroethane, and an average antimony phosphate derivative particles size of less than 200 nm.

11. A polyester oligomer comprising:
   (a) a dicarboxylic acid component comprising dicarboxylic acid units having 2 to about 20 carbon atoms; and
   (b) a diol component comprising diol units having 2 to about 16 carbon atoms;
   said oligomer having an inherent viscosity from above 0 to about 0.2 dL/g, measured in 40:60 v/v phenol/tetrachloroethane, and wherein said oligomer contains antimony phosphate derivative particles having an average diameter less than about 200 nm.

12. The polyester oligomer of claim 11 wherein said oligomer has a solution turbidity less than about 20 NTU, determined from a solution of 2.30 g of ground oligomer in 30 mL of 30:70 v/v hexafluoroisopropyl alcohol/methylene chloride.

13. A polyester comprising:
   (a) a dicarboxylic acid component comprising dicarboxylic acid units having 2 to about 20 carbon atoms; and
   (b) a diol component comprising glycol units having 2 to about 16 carbon atoms;
   said polymer having an inherent viscosity of about 0.2 to 1.2 dL/g, as determined in 40:60 v/v phenol/tetrachloroethane, and
   (c) antimony phosphate derivative particles having an average diameter of less than about 200 nm.

14. The polyester of claim 13 having a solution turbidity less than about 20 NTU, determined from a solution of 2.30 g of ground polymer in 30 mL of 30:70 v/v hexafluoroisopropyl alcohol/methylene chloride.

15. The polyester of claim 13 wherein said dicarboxylic acid units comprise residues of acids selected from the group consisting of terephthalic acid, isophthalic acid, naphthalenedicarboxylic acid and mixtures thereof.

16. The polyester of claim 13 wherein said polyester is formed by melt polymerization and solid state polymerization.

17. A high clarity article of manufacture formed from the polyester of claim 13 selected from the group consisting of blow-molded articles and extruded articles.

18. A process comprising:
   reacting at least one dicarboxylic acid or ester thereof having 2 to about 20 carbon atoms with at least one diol having 2 to about 16 carbon atoms in a solvent having a boiling point between above the boiling point of water and about 300° C., under esterification or prepolymer conditions comprising a temperature from above about the boiling point of water to about 300° C., and a pressure of about 10 to 800 kPa., said process being characterized by adding preformed antimony phosphate derivative particles suspended in at least one diol and forming polyester oligomers containing antimony phosphate derivative particles.

19. The process of claim 18 wherein, after adding said preformed antimony phosphate derivative particles, the concentration of antimony in said mixture is about 10 to 500 ppm and the concentration of phosphorus in said mixture is about 1 to about 500 ppm, calculated as the weight of antimony and phosphorus, respectively, in said polyester oligomer.

20. The process of claim 18 wherein said antimony phosphate derivative particles are added to the mixture having a degree of polymerization of from 1 to about 30.

21. The process of claim 18 further comprising the step of polycondensing said polyester oligomer under polycondensation conditions to form a polyester.

* * * * *